Patented Sept. 11, 1934

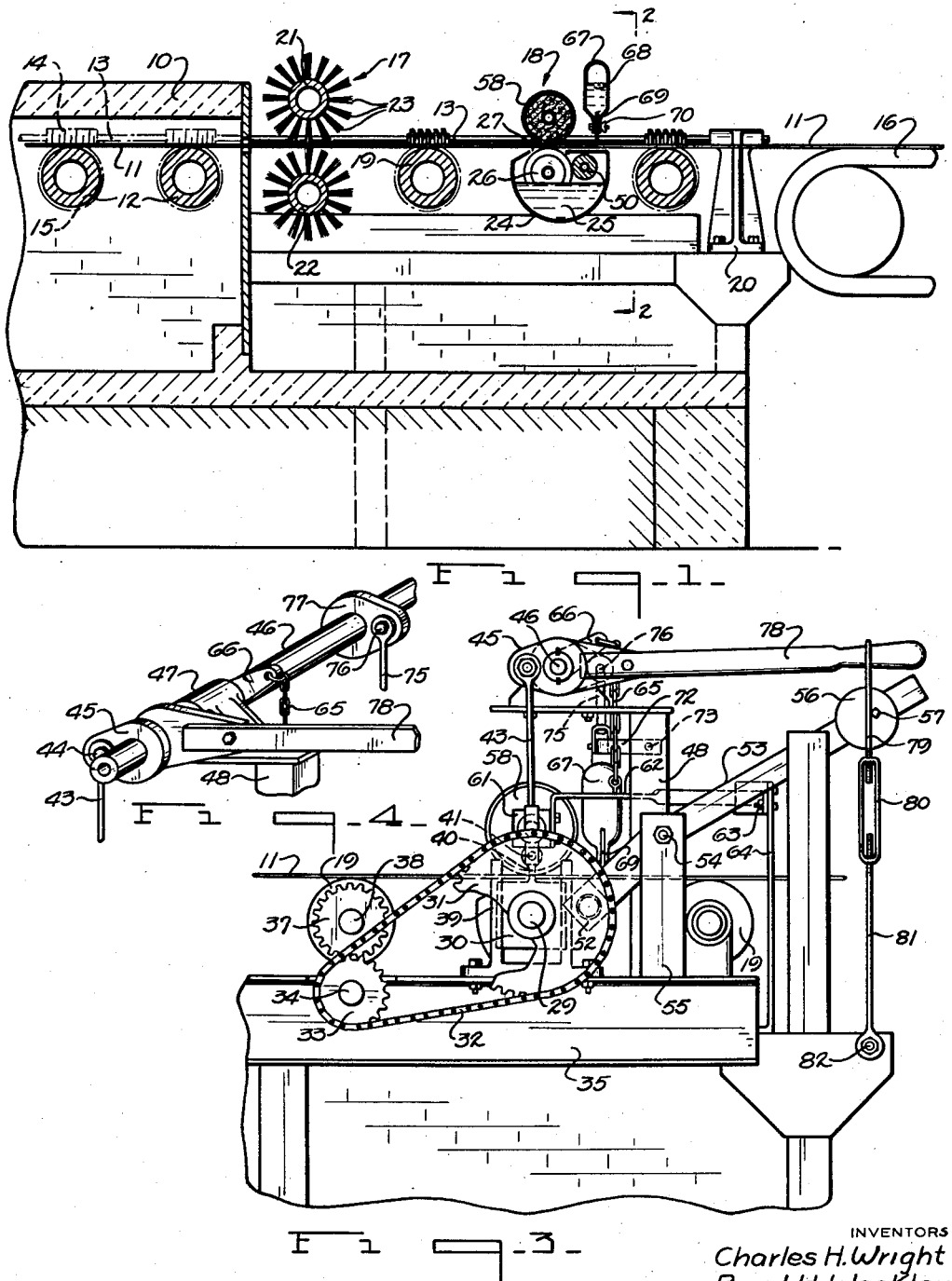

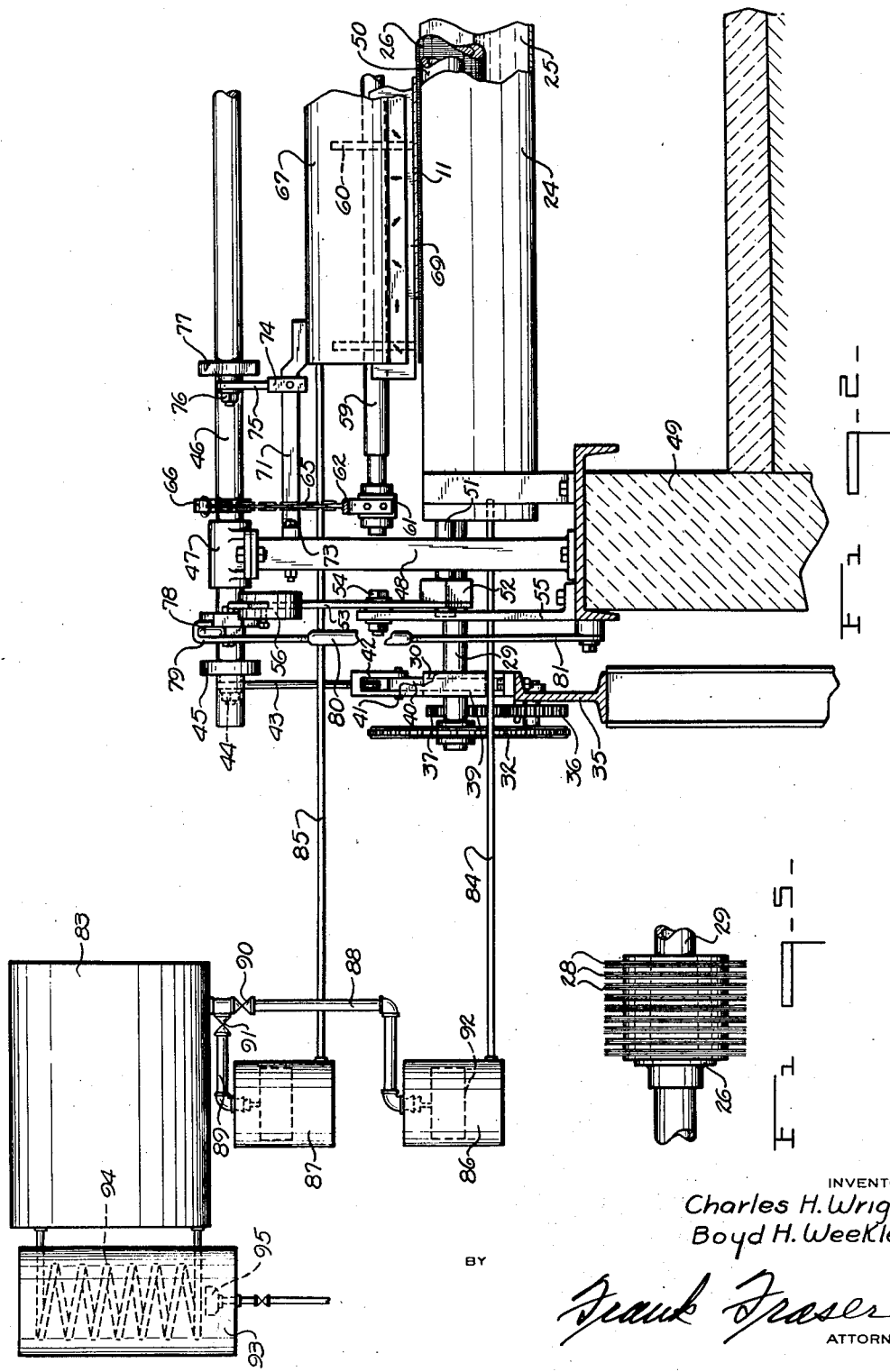

1,972,965

UNITED STATES PATENT OFFICE 1,972,965

APPARATUS FOR TREATING SHEET GLASS

Charles H. Wright and Boyd H. Weekley, Shreveport, La., assignors to Libbey-Owens-Ford Glass Company, Toledo, Ohio, a corporation of Ohio Application May 13, 1931, Serial No. 536,966

4 Claims. (Cl. 49—14)

The present invention relates to a method and apparatus for cleaning and/or treating sheet glass and is particularly adapted for use in connection with continuous flat drawn glass, although of course not restricted thereto.

In accordance with one well known process for producing sheet glass, a continuous glass sheet or ribbon is drawn upwardly from a bath of molten glass contained in a working receptacle, after which it is deflected into the horizontal plane about a suitable bending roll and then passed horizontally into and through an annealing leer, the said sheet issuing from the leer onto a cutting table upon which it is cut transversely into separate sheet sections or plates. In the process referred to above, it has heretofore been customary, after the glass was removed from the cutting table, to subject it to an acid treatment by dipping the sheets or plates into an acid water bath for the purpose of covering the same with a desired chemical coating to prevent discoloration thereof. This acid treatment of the glass sheets, as heretofore carried out, involved considerable handling of the glass which naturally resulted in the expenditure of both time and labor. For instance, in the past, upon the removal of the sheets from the cutting table, they were placed or set up on specially constructed wooden bucks and these bucks were then submerged with the sheets in an acid bath contained in relatively large so-called dip-tanks. After being permitted to remain in the dip-tank for the desired length of time, the bucks and glass were removed therefrom and the glass then taken from the bucks to the cutting room.

The principal aim and object of this invention is to reduce to a minimum the required handling of the glass sheets by the provision of novel and improved method and means for continuously and automatically cleaning and/or treating the glass as it issues from the annealing leer, thereby entirely eliminating the use of the dip-tanks referred to above.

Another important object of the invention is the provision of a method and apparatus whereby opposite surfaces of the glass sheet may be subjected simultaneously to an acid treatment whereby the said surfaces will be covered with the desired chemical coating to prevent discoloration thereof and in such a manner that breakage of the glass sheets, incident to such acid treatment, will be reduced to a minimum.

Another object of the invention is the provision of such a method and apparatus wherein the acid solution is applied to the glass sheet while it is still sufficiently hot to encourage rapid drying and evaporation of the moisture applied so as to leave the desired chemical coating thereupon.

A further object of the invention is the provision of novel means positioned above and beneath the path of travel of the sheet and engaging the respective opposite surfaces thereof for applying the desired coating thereto.

A still further object of the invention is the provision of such an apparatus embodying novel means for adjusting the position of the various parts thereof whereby to control the application of the acid to the sheet.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through apparatus provided by the present invention, Fig. 2 is a vertical section taken substantially on line 2—2 of Fig. 1, Fig. 3 is a side elevation thereof, Fig. 4 is a detail perspective view of a portion of the adjusting means, and Fig. 5 is a detail view of a portion of the acid applying brush.

Referring now to the drawings, the numeral 10 designates the exit end of a horizontally disposed annealing leer through which the continuous glass sheet or ribbon 11 is passed and wherein the said sheet is supported upon a plurality of horizontally aligned rolls 12. The leer rolls 12 are driven from a line shaft 13 arranged outwardly thereof and having keyed thereto a plurality of worms 14, one being provided for each leer roll 12 and meshing with a worm gear 15 carried at the corresponding end thereof. As the sheet or ribbon 11 issues from the annealing leer 10, it is received upon a suitable cutting table 16 which may be of the endless belt type disclosed in the drawings, the continuous sheet being cut transversely while upon the cutting table into individual sheet sections or plates which are then subsequently divided into a number of smaller lights.

According to the present invention, there is interposed between the exit end of leer 10 and the cutting table 16 the novel and improved means herein provided for cleaning and/or treating the glass sheet in the manner set forth above. The cleaning means is designated in its entirety by the numeral 18, the sheet being supported in its passage from the leer to the cutting table upon a plurality of spaced rolls 19 similar to the leer rolls 12 and driven in the same manner from the line shaft 13 which is supported at its outer end in a vertical bearing bracket 20.

The cleaning means 17 comprises, as shown, the upper and lower rotatable brushes 21 and 22 mounted above and beneath the sheet respectively and being provided with bristles 23 which are adapted to engage opposite surfaces of the glass sheet to effect the desired cleaning thereof. The brushes 21 and 22 may be of any desired construction and positively driven in any preferred manner.

The acid applying means 18 includes a receptacle or vat 24 extending transversely beneath the path of travel of the sheet 11 and adapted to contain the acid water solution 25. Disposed within the receptacle 24 and also extending transversely of the sheet is a horizontally disposed acid applying or wiping roll 26, the lower portion of which is immersed within the acid solution 25, while the upper portion thereof projects through a slot 27 in the top of receptacle 24 and contacts with the under-surface of the glass sheet 11. The wiping roll 26 is preferably composed of a relatively large number of muslin discs or the like 28 (Fig. 5) carried by the shaft 29 which is journaled at each end in a bearing block 30.

For the purpose of driving wiping roll 26, the said roll shaft 29 may have keyed thereto at one end a relatively large sprocket gear 31 about which is trained a sprocket chain 32, said chain being also trained about a sprocket gear 33 mounted upon pin 34 carried by the horizontal supporting beam 35. Also keyed to pin 34 is a second gear 36 meshing with and driven from the gear 37 carried by the shaft 38 of one of the rolls 19. With the driving means disclosed, the roll 26 will be driven in a direction opposite to the direction of forward movement of the sheet. Upon rotation of the said roll, the muslin discs 28 are adapted to pick up a certain amount of the acid solution 25 and apply or wipe it evenly upon the undersurface of the glass sheet. It is preferred that the roll be driven in this manner although the invention is not restricted thereto. Furthermore, the wiping roll 26 may be driven by means other than that herein disclosed.

The bearing blocks 30 for the roll 26 are slidable vertically within substantially U-shaped guide brackets 39 rigidly secured to the supporting beams 35. Each bearing block 30 is provided with a vertical ear 40 to which is pivoted as at 41 an inverted U-shaped member 42 through the upper end of which is threaded a vertical rod 43 pivoted at its upper end as at 44 to a lever arm 45 carried by a horizontal rocker shaft 46, said shaft being journaled adjacent its opposite end in bearings 47 carried by vertical supports 48 secured to the foundation 49. Thus, upon rocking movement of the shaft 46, the roll 26 can be raised or lowered as desired relative to the glass sheet.

In order to prevent an excessive amount of the acid solution from being applied to the glass, there is also disposed within the receptacle 24 a wringer roll 50 engaging the wiping roll 26 for wringing the said roll to the proper moisture consistency. The roll 50 is of course maintained above the level of the acid water solution 25 and is mounted upon a shaft 51 supported at each end in a bearing block 52, the bearing block at each end of the roll being carried at the lower end of a rocker arm 53 fulcrumed intermediate its ends as at 54 to the fixed upright 55. Slidably received upon the arm 53, outwardly of pivot point 54, is an adjustable weight 56 held in position by a screw or the like 57. Upon proper adjustment of the weight 56 along the arm 53, it will be readily apparent that the pressure of the wringer roll 50 against the wiping roll 26 can be varied as desired to maintain a uniform moisture.

Positioned above the glass sheet 11 and in superimposed relation with respect to the wiping roll 26 is a pressure roll 58, said roll consisting, as best shown in Fig. 2, of a shaft 59 upon which are mounted longitudinally thereof a plurality of spaced discs 60 adapted to engage the upper surface of the sheet for holding the said sheet downwardly in engagement with the wiping roll. The shaft 59 of roll 58 is journaled at each end in a bearing 61 secured to the downturned end portion of a horizontally disposed resilient strap 62 fastened at its opposite end as at 63 to the vertical bracket 64. Connected to the strap 62, intermediate its ends, is a chain 65 secured at its upper end to the lever arm 66 keyed upon rocker shaft 46. Due to the resiliency of the strap 62, the pressure roll 58 can be raised and lowered relative to the glass sheet upon rocking movement of shaft 46.

Since the lever arms 45 and 66, from which the wiping roll 26 and pressure roll 58 respectively are hung, are positioned at opposite sides of the longitudinal axis of rocker shaft 46, it will be seen that when the said shaft is turned in one direction, the said rolls 26 and 58 will be simultaneously moved toward one another and into engagement with the sheet and that when the shaft is rocked in the other direction, the said rolls will be moved away from one another and out of contact with said sheet.

Also positioned above the sheet 11 forwardly of the pressure roll 58 is a container 67 extending transversely of the sheet and adapted to contain a supply of acid water solution 68. This container is provided in the bottom thereof with a vertical slot through which is inserted a wick 69, being held in place by a plurality of thumb screws 70. The wick 69 projects upwardly into the solution 68 and also downwardly beneath the container so as to engage the upper surface of the glass sheet. The said wick may be of any desired material which will become impregnated with the solution 68 and will function to conduct the same by capillary attraction to the upper surface of the glass sheet. The wick is adapted to wipe the solution on evenly over the entire upper surface of the glass.

The container 67 is supported at each end by means of a horizontal bracket arm 71 secured at one end to the top thereof and at its opposite end being turned at substantially right angles as at 72 and pivoted as at 73 to the vertical support 48. Connected to the bracket arm 71 adjacent the container is a strap 74 to which is secured the hanger rod 75 pivoted at its upper end as at 76 to a lever arm 77 fixed to shaft 46 so that, upon rocking movement of the said shaft, the container 67 can be raised or lowered to vary the pressure of the wick 69 upon the upper surface of the glass sheet. It will be noted that since the lever arm 77 is positioned to one side of the longitudinal center of shaft 46 and the lever arm 45 to the opposite side, the wiping roll 26 and wick 69 will be moved simultaneously into and out of engagement with the sheet, depending upon in which direction the said shaft is turned.

In order to control the rocking movement of shaft 46 and thereby the relative positions of the wiping roll 26, pressure roll 58, and container 67, there is carried by the said shaft an operating lever 78 to the outer end of which is connected one end of a rod 79 in turn connected by a turn buckle 80 to the rod 81 secured as at 82 to a fixed support. The weight of the wiping roll 26 and associated parts to the one side of shaft 46 is adapted to normally overbalance the weight of the pressure roll 58 and container 67 to the opposite side thereof, with the result that there will be a tendency to rock the shaft 46 in a counter-clockwise direction and swing the outer end of lever 78 upwardly. However, the said lever will be held downwardly in proper position by the rod 79. Upon rotation of turn buckle 80 to draw the lever 78 downwardly, the shaft 46 will be rocked to move the wiping roll 26, pressure roll 58, and container 67 towards the sheet, whereas when the turn buckle is rotated in the opposite direction, the shaft will be rocked in the opposite direction so as to cause the wiping roll, pressure roll, and container to be moved away from the sheet.

The acid water solution may be supplied to the receptacle 24 and container 67 from a storage tank 83 through pipes 84 and 85 respectively. However, the solution does not flow directly from the tank 83 into pipes 84 and 85, but instead flows first into the receptacles 86 and 87, the solution passing into receptacle 86 through pipe 88 and into receptacle 87 through pipe 89. Valves 90 and 91 respectively are provided to control the amount of liquid flowing into the receptacles 86 and 87. Located within each receptacle 86 and 87 is a float valve 92 adapted to automatically shut off the supply of solution to the receptacles after a sufficient quantity has been received therein. For the purpose of maintaining the acid water solution within the tank 83 at the proper temperature, there may be provided a gas heater 93 at one end thereof, said heater including the usual coils 94 communicating with tank 83 and being heated from below by a gas burner or the like 95.

In the operation of the apparatus above described, the shaft 46 is first rocked in the desired direction upon actuation of turn buckle 80 to regulate the desired pressure of the rolls 26 and 58 and wick 69 upon opposite surfaces of the glass sheet 11, and likewise the position of weight 56 along arm 53 is adjusted according to the pressure to be exerted by roll 50 against roll 26. The sheet 11 issuing from the leer 10 passes first between the cleaning brushes 21 and 22 which serve to effect the necessary cleaning of the opposite surfaces thereof. As the sheet continues forwardly, it passes between the wiping roll 26 and pressure roll 58 whereupon the said roll 26, due to the rotation thereof, will pick up the desired amount of acid water solution and wipe it evenly upon the under-surface of the glass. The sheet then continues forwardly beneath and in engagement with the wick 69 which functions to wipe the acid solution evenly upon the upper surface thereof, said sheet then passing onto the cutting table 16 upon which it is divided transversely into a plurality of sheet sections.

From the above, it will be readily apparent that the treatment of the sheet is continuously and automatically effected as it issues from the annealing leer and that as a consequence, the required handling of the glass is reduced to a minimum. With the apparatus disclosed, the sheet can be cleaned and the surfaces thereof covered with a suitable acid water solution rapidly and conveniently and in an effective and efficient manner. Furthermore, due to the fact that the sheet is still quite hot as it issues from the leer, the application of the liquid thereto is made while the same still contains sufficient temperature to encourage rapid drying whereby to cause the moisture to evaporate and leave upon the glass sheet the desired chemical coating which acts as a preventative against discoloration.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus of the character described, the combination of means for supporting and conveying a glass sheet in a definite, substantially horizontal path, a rotatable roll disposed beneath the sheet for applying an acid water solution to the under-surface thereof, a receptacle containing a supply of acid water solution and within which the lower portion of said roll is immersed, a wringer roll adapted to engage said first mentioned roll for controlling the amount of solution applied thereby to the glass, and separate means mounted above the sheet for applying an acid water solution to the upper surface thereof, said last mentioned means being maintained stationary during the application of the acid water solution to the glass, the application of the acid water solution to the opposite surfaces of the sheet being effected during the travel thereof.

2. In apparatus of the character described, the combination of means for supporting and conveying a glass sheet in a definite, substantially horizontal path, a rotatable roll disposed beneath the sheet for applying an acid water solution to the under-surface thereof, a receptacle containing a supply of acid water solution and within which the lower portion of said roll is immersed, a wringer roll adapted to engage said first mentioned roll for controlling the amount of solution applied thereby to the glass, a pressure roll mounted above the sheet in substantially superimposed relation to the first roll for maintaining said sheet in contact therewith, and separate means also disposed above the sheet for applying an acid water solution to the upper surface thereof, said last mentioned means being maintained stationary during the application of the acid water solution to the glass, the application of the acid water solution to the opposite surfaces of the sheet being effected during the travel thereof.

3. In apparatus of the character described, the combination of means for supporting and conveying a glass sheet in a definite, substantially horizontal path, a rotatable roll disposed beneath the sheet for applying an acid water solution to the under-surface thereof, a receptacle containing a supply of acid water solution and within which the lower portion of said roll is immersed, a wringer roll adapted to engage said first mentioned roll for controlling the amount of solution applied thereby to the glass, a pressure roll mounted above the sheet in substantially superimposed relation to the first roll for maintaining said sheet in contact therewith, separate means also disposed above the sheet for applying an acid water solution to the upper surface thereof, said last mentioned means being maintained stationary during the application of the acid water solution to the glass, and means for moving the first mentioned roll, pressure roll, and stationary means simultaneously toward and away from the sheet, the application of the acid water solution to the opposite surfaces of the sheet being effected during the travel thereof.

4. In apparatus of the character described, the combination of means for supporting and conveying a glass sheet in a definite, substantially horizontal path, a rotatable roll disposed beneath the sheet for applying an acid water solution to the under-surface thereof, a receptacle containing a supply of said solution and within which the lower portion of said roll is immersed, and a wringer roll adapted to engage said first mentioned roll for controlling the amount of solution applied thereby to the glass, the application of the acid water solution to the under surface of the sheet being effected during the travel thereof.

CHARLES H. WRIGHT.
BOYD H. WEEKLEY.